Dec. 13, 1966 G. HATCH 3,291,965
ELECTRIC WATER HEATER WITH SEDIMENT CHAMBER
Filed Oct. 9, 1963 2 Sheets-Sheet 1

INVENTOR.
GORDON HATCH
BY
Wheeler, Wheeler & Wheeler
ATTORNEYS.

Dec. 13, 1966 G. HATCH 3,291,965
ELECTRIC WATER HEATER WITH SEDIMENT CHAMBER
Filed Oct. 9, 1963 2 Sheets-Sheet 2

INVENTOR.
GORDON HATCH
BY
Wheeler, Wheeler & Wheeler
ATTORNEYS.

United States Patent Office 3,291,965
Patented Dec. 13, 1966

3,291,965
ELECTRIC WATER HEATER WITH SEDIMENT
CHAMBER
Gordon Hatch, Milwaukee, Wis., assignor to Hatco Corporation, Milwaukee, Wis., a corporation of Wisconsin
Filed Oct. 9, 1963, Ser. No. 315,025
8 Claims. (Cl. 219—314)

This invention relates to a heater with sediment chamber drainable without exposing the heating element to injury.

The invention may be incorporated in many different organizations. Each of the embodiments illustrated comprises a sealed heater tank provided with a sediment chamber into which the inlet pipe opens and within which a thermostat bulb is preferably disposed. The chamber is partially separated from the rest of the tank by a partition or baffle. In one embodiment, this is provided by a tube having its lower end welded to the bottom of the tank. A drainpipe opens from the sediment chamber for removal of sediment. Water entering the tank is delivered into the sediment chamber and has to pass over the top of the partition or baffle in proximity to the bulb of an over-temperature thermostat.

The heating element is located in the tank outside of the sediment chamber and at a level well below the top of the baffle. The electrical connections are such that the two thermostats together control the heating element to energize it when cold water enters the sediment chamber and to de-energize it when the temperature of water in the upper portion of the tank reaches the maximum desired temperature. The water delivery pipe preferably opens from the top of the tank.

While reference has been made to water, it will be understood that embodiments of the invention may be used for heating any liquid.

Figure 4:
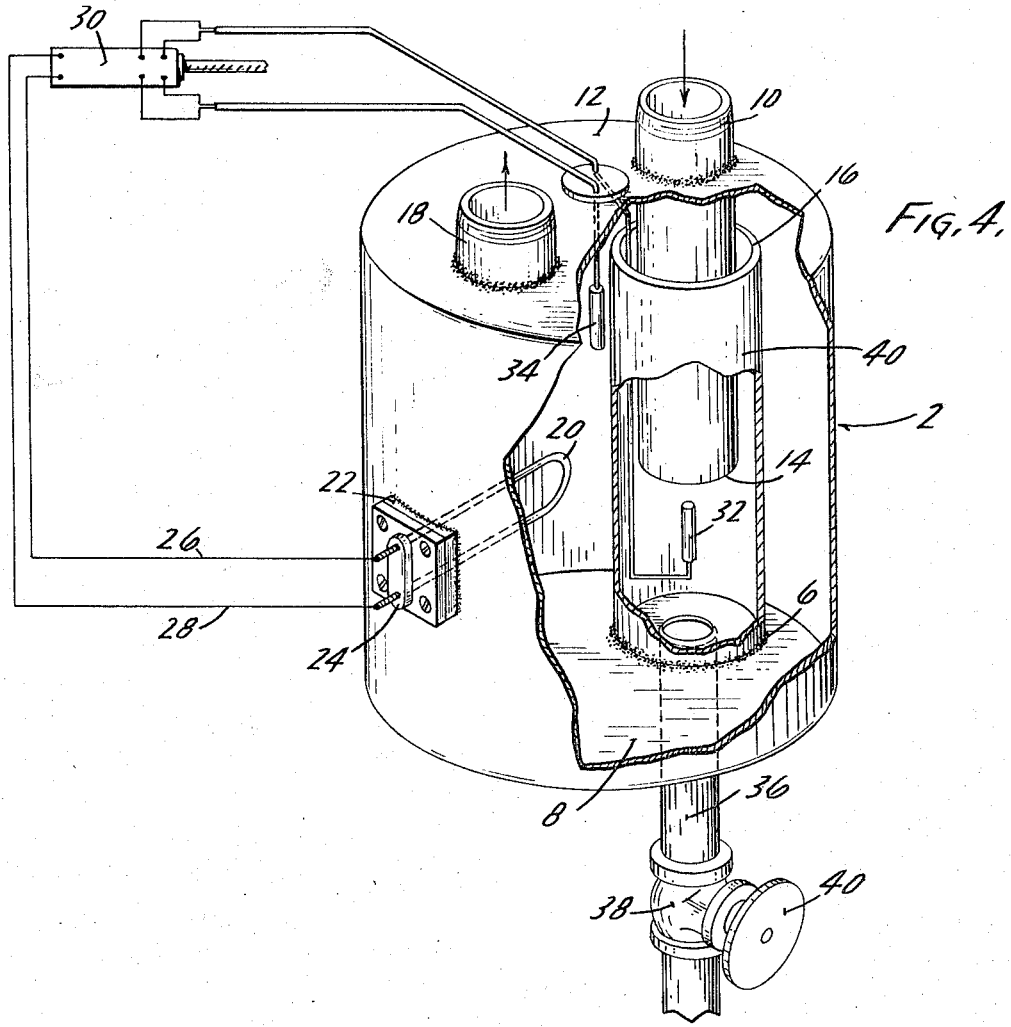
FIG. 4 shows in perspective a modified embodiment of a heater embodying the invention, portions of the tank wall and the baffle being broken away to expose details of construction.

The tank 1 is provided interiorly with a sediment chamber 5 communicating with the tank proper and preferably made by means of a baffle 3. In FIG. 4 the tank 2 has a baffle 4 which comprises a length of pipe connected by weld 6 to the bottom 8 of the tank.

The inlet pipe 10 enters through the top wall 12 of the tank. In the FIG. 4 construction it extends downwardly within the baffle 4, its lower end 14 being spaced above the bottom wall 8. The incoming liquid will pass beneath the lower end 14 of the inlet pipe. In both constructions, the water must flow upwardly over the top end 16 of the baffle, this being spaced somewhat below the top wall 12 of the tank. The outlet pipe from the tank is here represented by the nipple 18 which opens through the top wall 12.

Figure 1:
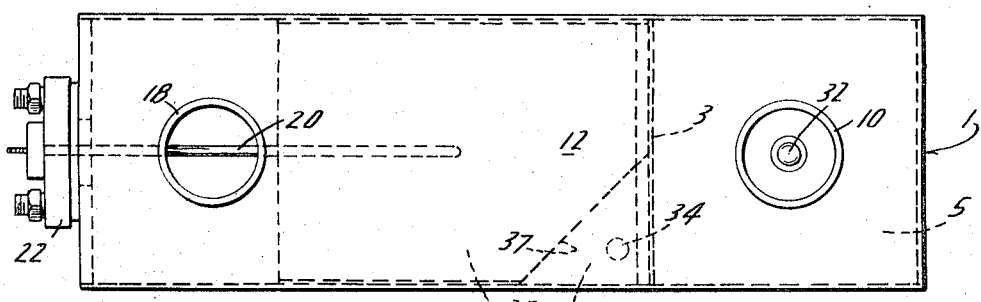
FIG. 1 is a plan view of a heater embodying the invention.
Figure 2:
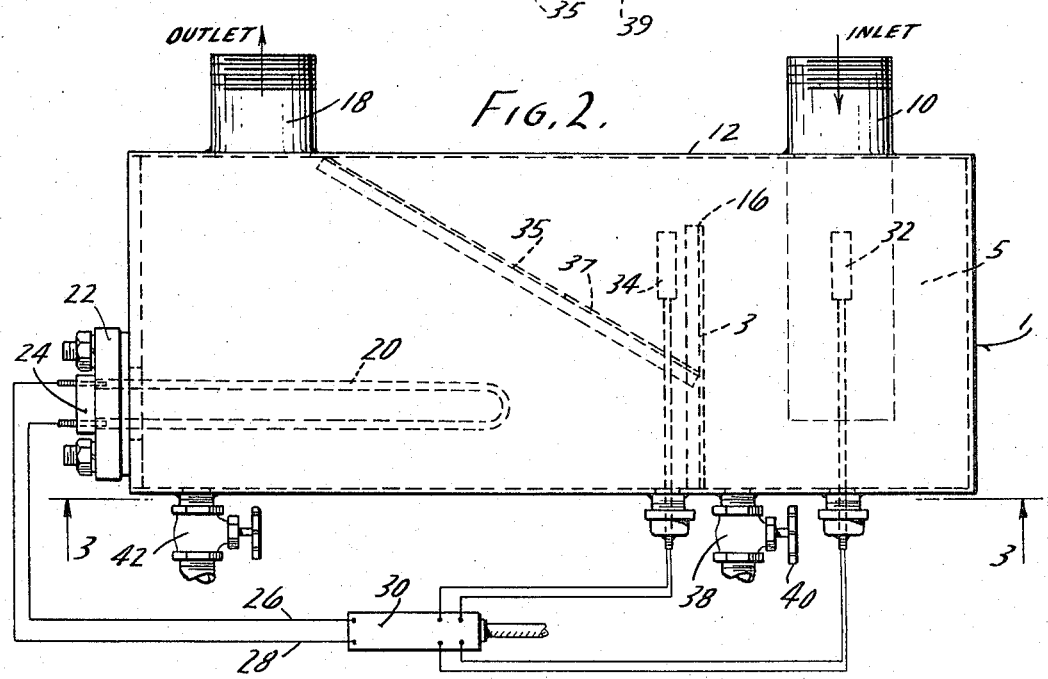
FIG. 2 is a side elevation of the heater shown in FIG. 1, electrical connections being diagrammatically illustrated.
Figure 3:
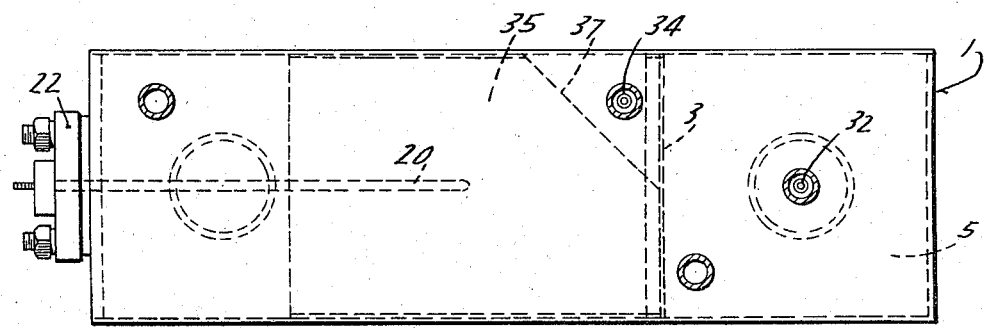
FIG. 3 is a bottom plan view of the heater shown in FIG. 2, the connections being shown in section on the line 3—3 of FIG. 2.

Within the tank there is an electrical resistance heating element 20 having a conventional mounting 22 for attaching it to the side of the tank and having a junction block 24 at which the heating element is connected by wires 26 and 28 to the conventional thermostatic relay set 30. The thermostat bulb 32 normally controls the temperature of the liquid in the tank 2 and is disposed in the sediment chamber below the top of the baffle wall and in the path of the incoming liquid so as to energize the heating element 20 as soon as cool liquid enters the heater. Both in the embodiment of FIGS. 1 to 3 and that of FIG. 4, I have provided an over-temperature thermostat bulb 34 which is located immediately near and below the level of the top 16 of the baffle which segregates the sediment chamber from the rest of the tank. Thermostatic bulb 34 serves to de-energize the heating element 20 whenever the temperature of the liquid in the tank becomes excessive at the level of bulb 34. It is preferred to provide an inclined baffle 35 which extends downwardly from the top of the tank toward the baffled partition 3 and is cut away at a margin 37 to provide an opening at 39 adjacent which the over-temperature thermostat bulb 34 is located, the object being to require the flow from the sediment chamber toward the heating element 20 to pass close to the over-temperature thermostat bulb 34. The arrangement also permits thermostat 20 to continue in operation a trifle longer while inlet flow of cold water is occurring than would be possible if the water heated by the element 20 could circulate freely past the bulb 34. This is advantageous in assuring a quick warm up of incoming water. Although I have shown this baffle only in the construction of FIGS. 1 to 3, it will be apparent that a similar arrangement can be incorporated in FIG. 4 if desired.

Sediment entering the tank with the incoming liquid tends to be deposited in the sediment chamber and from time to time it may be withdrawn through the drainpipe 36 subject to the control of a valve 38 having hand wheel 40.

That portion of the tank which is outside of baffle 4 may be provided with its own drain valve as shown at 42, but this section of the tank is not required to be drained for cleaning purposes because of the fact that sediment is caught in chamber 5. Consequently, use of the drain valve 42 is optional.

One of the advantages of the disclosed arrangement consists in the fact that the withdrawal of sediment through the pipe 36 by opening the drain valve 38 can never result in damage to the heating element 20 because the contents of the tank 2 can never be drained by valve 38 to a level below the upper end 16 of the baffle 3 or 4. When the water in the tank reaches that level, the sediment chamber will be emptied without further draining the tank. If the heating element 20 is energized under these conditions, any excess of heat in the part of the tank heated by element 20 will cause the thermostatic bulb 34 to respond to de-energize the thermostat. It it were not for the fact that the baffle precludes any wihdrawal of water to the level of the bulb 34 and below such level, the water temperature developed by the heating element would not reach the bulb, and overheating might result.

The precise illustrated locations of the bulbs 32 and 34 are very desirable. The bulb 32 responds immediately to any reduction in temperature represented by the admission of liquid to the tank. Since bulb 34 is in the path followed by such liquid as it moves from the sediment chamber into the main tank, the cooling effect of the newly-admitted liquid prevents the over-temperature bulb from responding prematurely to the increase in temperature brought about when the heating element 20 is energized by the cooling of bulb 32. In effect, the arrangement anticipates the heating requirements of the incoming cooler liquid within the baffle, even though such liquid is not immediately exposed to the heat of the energized heating element 20.

I claim:

1. In a heater, the combination with a main tank having a heating element in a lower portion thereof, baffle means of less height than the main tank but extending to a level above the heating element for partially segregating a sediment chamber from the main tank portion in which the heating element is disposed, the baffle means partitioning the sediment chamber against direct communication with said lower portion of the main tank and providing an opening affording communication substantially directly between the top of the sediment chamber and an upper portion of the main tank, a supply pipe opening into the sediment chamber, a drain pipe opening from the sediment chamber, a liquid-delivery pipe opening from the said main tank portion outside of the sediment chamber, a thermostat operatively connected to control said heating element and having an energizing bulb disposed within the sediment chamber in the path of liquid delivered thereto through said pipe, and an over-temperature thermostat operatively connected to control said heating element and having a bulb located in the main tank externally of said chamber at a level higher than that of the heating element and lower than the level of communication between the sediment chamber and the main tank.

2. A heater according to claim 1 in which the baffle comprises a tube having means connecting its lower end to the bottom of the tank and having its upper end spaced below the top of the tank.

3. A heater according to claim 2 in which said supply pipe extends into the tube.

4. A heater according to claim 1 in which a second baffle is interposed between the top of the tank and sides of the tank and the baffle first mentioned, and has an opening affording restricted communication from the upper portion of the tank to the portion of the tank in which the heating element is disposed, said over-temperature thermostat being disposed in the path of flow through said opening.

5. A heater comprising a liquid storage tank having top and bottom and side walls, an electrical resistor-type heating element mounted on the side wall and extending into a portion of the tank at a point well below the top of the tank, a baffle having a lower end in connection with the bottom wall of the tank and having an upper end spaced below the top wall of the tank and extending to a level materially above the level of the heating element, said baffle being substantially closed below its said upper end to establish a settling chamber partially isolated from the said tank portion and extending to the height of the baffle for segregating input liquid from the heating element in said tank portion, thermostatic means for controlling the heating element and including an energizing bulb disposed within the settling chamber and a de-energizing over-temperature bulb located in said tank portion outside of the settling chamber and adjacent to but below the upper end of the baffle, an inlet pipe constituting means for delivering liquid into the tank and extending into the settling chamber, means for delivering liquid from the tank and extending from the top wall thereof, means for draining the settling chamber below the top of the baffle and constituting a drainpipe opening through the bottom wall of the tank from the interior of the settling chamber, and means for controlling flow through said drainpipe.

6. A heater according to claim 5 in which the baffle comprises a tube connected with the bottom of the tank in an offcenter position therein, the tank being generally cylindrical.

7. A heater according to claim 5 in which the tank is oblong, the baffle extending across the tank.

8. A heater according to claim 7 in which an oblique baffle extends from the top wall of the tank adjacent the liquid delivering means and between opposite side walls of the tank downwardly toward the baffle first mentioned and having an opening adjacent the baffle first mentioned and in the path of flow past said over-temperature bulb.

References Cited by the Examiner

UNITED STATES PATENTS

| 1,047,389 | 12/1912 | Cooper | 219—314 |
| 1,767,122 | 6/1930 | Dean | 219—315 X |
| 2,742,560 | 4/1956 | Liebhafsky | 219—316 X |

FOREIGN PATENTS

| 719,433 | 12/1954 | Great Britain. |

ANTHONY BARTIS, *Primary Examiner.*